US009609567B2

(12) United States Patent
Stojanovski et al.

(10) Patent No.: US 9,609,567 B2
(45) Date of Patent: *Mar. 28, 2017

(54) MULTIHOMED COMMUNICATION DEVICE

(71) Applicant: LG ELECTRONICS INC., Seoul (KR)

(72) Inventors: Saso Stojanovski, Paris (FR); Arnaud Vedrine, Paris (FR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,694

(22) Filed: Jun. 24, 2016

(65) Prior Publication Data
US 2016/0309383 A1 Oct. 20, 2016

Related U.S. Application Data

(63) Continuation of application No. 13/512,093, filed as application No. PCT/KR2010/009371 on Dec. 27, 2010, now Pat. No. 9,392,522.
(Continued)

(51) Int. Cl.
H04W 4/00 (2009.01)
H04W 36/22 (2009.01)
H04L 12/707 (2013.01)
H04W 40/02 (2009.01)
H04W 48/00 (2009.01)
(Continued)

(52) U.S. Cl.
CPC ............ *H04W 36/22* (2013.01); *H04L 45/22* (2013.01); *H04W 40/02* (2013.01); *H04W 40/246* (2013.01); *H04W 48/16* (2013.01);

*H04W 48/17* (2013.01); *H04W 76/025* (2013.01); *H04W 48/20* (2013.01); *H04W 84/045* (2013.01); *H04W 88/06* (2013.01)

(58) Field of Classification Search
USPC .......... 370/237, 238, 355, 356, 392, 395.31, 370/395.32, 238.1
See application file for complete search history.

(56) References Cited

U.S. PATENT DOCUMENTS 8,566,455 B1 10/2013 Zhao et al.
2004/0176077 A1 9/2004 Loveland
(Continued)

FOREIGN PATENT DOCUMENTS

KR 10-2005-0033799 A 4/2005
KR 10-2007-0079518 A 8/2007

*Primary Examiner* — Zewdu A Beyen
(74) *Attorney, Agent, or Firm* — Birch, Stewart, Kolasch & Birch, LLP

(57) ABSTRACT

A method and a user equipment (UE) for routing a data packet in a wireless communication network are discussed. The method according to an embodiment includes establishing, by the UE, a packet data network (PDN) connection via a 3rd Generation Partnership Project (3GPP) cellular network; obtaining, by the UE from an Access Network Discovery and Selection Function (ANDSF) server, a routing rule including information on an access point name (APN) and a priority of the APN, the APN identifying a packet data network (PDN) connection; and performing, by the UE, an offload function by selecting a gateway via the 3GPP cellar network based on the priority of the APN. The routing rule comprises identification information in the form of an IP 5-tuple allowing the UE to route the data packet.

4 Claims, 4 Drawing Sheets

Related U.S. Application Data

(60) Provisional application No. 61/295,743, filed on Jan. 17, 2010.

(51) Int. Cl.
  *H04W 76/02* (2009.01)
  *H04W 40/24* (2009.01)
  *H04W 48/16* (2009.01)
  H04W 48/20 (2009.01)
  H04W 84/04 (2009.01)
  H04W 88/06 (2009.01)

(56) References Cited

U.S. PATENT DOCUMENTS

| | | |
|---|---|---|
| 2005/0080644 A1 | 4/2005 | Greef et al. |
| 2009/0103710 A1 | 4/2009 | Ding et al. |
| 2010/0027448 A1 | 2/2010 | Puthiyandyil et al. |
| 2010/0138565 A1 | 6/2010 | Brisebois |
| 2010/0272013 A1 | 10/2010 | Horn et al. |
| 2010/0309843 A1 | 12/2010 | Mahendran et al. |
| 2011/0171953 A1 | 7/2011 | Faccin et al. |
| 2012/0196644 A1 | 8/2012 | Scherzer et al. |

MULTIHOMED COMMUNICATION DEVICE

CROSS-REFERENCE TO RELATED APPLICATIONS

This Application is a Continuation of co-pending U.S. patent application Ser. No. 13/512,093 filed on May 25, 2012, which is the National Phase of PCT/KR2010/009371 filed on Dec. 27, 2010, which claims the benefit under 35 U.S.C. §119(e) to U.S. Provisional Application No. 61/295,743 filed on Jan. 17, 2010, all of which are hereby expressly incorporated by reference into the present application.

BACKGROUND OF THE INVENTION

Field of the Invention

The invention relates in particular to a method for routing an uplink IP packet of a cellular device and to a cellular device implementing said method.

Discussion of the Related Art

In 3GPP cellular systems, a cellular terminal (referred to as UE) can access several IP networks in parallel by establishing a so-called Packet Data Network (PDN) connection (also referred to as Primary PDP Context in pre-Rel-8 3GPP specifications) to each of the PDNs it wishes to access. A typical use case is the following. The UE may need to access the Internet in parallel to the operator's IP Multimedia Subsystem (IMS) and in parallel to the user's corporate intranet. On every PDN connection the UE is assigned a distinct IP address. In IETF parlance, the UE is an IP host with multiple IP interfaces, also referred to as "multi-homed host".

A general issue with multi-homed terminals is that when sending an IP packet the terminal needs to select the correct interface, the reason being that parallel PDNs may be disjoint networks using private IP address space and specific destinations can be reached on a specific PDN only. Selecting the correct IP interface is a routing decision and needs to be performed not only for data traffic, but also for control packets, such as DNS requests.

In some cases it is possible to reach the same set of destination IP addresses (e.g. the public Internet addresses) via more than one PDN. In such scenarios it is desirable to select the most appropriate PDN e.g. the one incurring the lowest transport cost.

The IETF has recently started working on a similar problem, namely the problem of hosts having multiple network interfaces (physical interfaces, virtual interfaces, or combinations thereof). The IETF has created a working group called MIF (for Multiple InterFaces) whose charter is available on the Internet (see IETF MIF working group's charter: http://www.ietf.org/dyn/wg/charter/mif-charter.html). However this working group has not yet come up with much output beyond the problem description and a list of current practices in terminal implementations. The current practices rely on a number of suboptimal mechanisms such as: static configuration (e.g. defining one interface as a primary interface for all traffic, which is typically the case for computers equipped with Windows operating systems up to Vista), or load sharing between the multiple interfaces (for traffic that can be sent on either interface), or trial-and-error mechanisms, etc. All these approaches are suboptimal as they do not take into account the specifics of the underlying IP networks (e.g. transport cost).

On the 3GPP side, the problem of multi-homed UEs has been touched upon as part of the Release-10 work item on "non-seamless WLAN offload" (see in particular 3GPP SP-090616 "WID on IP Flow Mobility and seamless WLAN offload" and 3GPP TS 23.861 "Feasibility study on MAPIM"). The offload is qualified as non-seamless because traffic is offloaded on a care-of address, which means that the session is broken if the radio access is changed (the address needs to change). The objective is to allow dual-mode dual radio terminals (i.e. UEs having a cellular and a WLAN interface) to use the WLAN access to connect to the Internet directly, without traversing the 3GPP operator's core network. As of September 2010, it was agreed that this can be achieved by provisioning operator's policies via extensions to the ANDSF (Access Network Discovery and Selection Function) framework (S2-104336) that was specified in 3GPP TS 23.402 ("Architecture enhancements for non-3GPP accesses; Stage 2"). But with non-seamless offload, when IP flows are sent to the WLAN, they are not associated with any specific APN. In other words, non-seamless offload operates on an IP flow basis, but does not choose an APN corresponding to the IP flow; instead it chooses a radio interface (e.g. WLAN). There is no PDN connection (which would be linked to a PGW and associated with an APN).

Depicted in FIG. 1 is an example scenario of non-seamless WLAN offload. A Rel-10 UE capable of non-seamless WLAN offload can do the following:
- use the cellular access (macro or femto) for access to either operator's services or the Internet;
- use the WLAN interface for non-seamless WLAN offload and access to either local resources or the Internet.

In this example the UE has one PDN connection via cellular access (PDN1) to the Operator's PDN. It is depicted as a grayed tunnel between the UE and the Packet Data Gateway (PGW), a node representing the ingress point to PDN1, which also assigns the IP address used by the UE on this PDN.

In order to be able to use the non-seamless WLAN offload feature, the UE needs to be dual mode (3GPP+WLAN) and dual radio. In the example in FIG. 1 the UE uses the WLAN access to directly access the Home network. Note that the Home network assigns another IP address to the UE—it is used in all IP packets that UE sends or receives via the Home network.

Some destinations are reachable only via PDN1 or via the direct WLAN access. For instance, the P-CSCF node (which is the ingress point to the operator's IP multimedia subsystem) is reachable only via PDN1, whereas the Home server is reachable only via the direct WLAN access. On the other hand, hosts residing in the Internet can be reached via either access.

Performing non-seamless WLAN offload in this example means routing Internet-bound traffic via the direct WLAN access whenever the UE is in WLAN coverage, because the cost of using WLAN is much lower compared to the cost of using the cellular access.

As the UE moves out of WLAN coverage, the Internet-bound traffic can be re-routed via PDN1.

Non-seamless WLAN offload was defined in 3GPP Rel-10. Routing policies described in the previous paragraphs are provided to the UE via extensions to the ANDSF (Access Network Discovery and Selection Function) architecture specified in 3GPP TS 23.402.

Since the Internet can be reached through both, ANDSF policies should steer Internet traffic towards WLAN, whenever available, and when non-seamless WLAN offload is used to access the Internet, the overall effect is similar to SIPTO from a femto cell ("femto-SIPTO"). SIPTO is explained below.

Depicted in FIG. 2 and FIG. 3 are the non-roaming and roaming ANDSF architectures (respectively), as defined in 3GPP TS 23.402.

The ANDSF can be accessed via either 3GPP or non-3GPP access, however, the provided information is used only in relation with a non-3GPP access.

The ANDSF architecture (optional) may be used to:
provide access network discovery information to the terminal e.g. a list of available WLAN or WiMAX hotspots corresponding to the current UE location;
provide Inter-System Mobility Policies (ISMPs) that steer the terminal to the preferred network access.

In Rel-10 the ANDSF was enhanced to provide Inter-System Routing Policies (ISRPs); among other things they are used to steer IP flows towards WLAN access for Non-seamless WLAN offload.

FIG. 4 shows a hypothetical terminal perspective in the context of a non-seamless WLAN offload. The Care-of Address is used for non-seamless WLAN offload in both cases. Inter-System Routing Policies (ISRPs) are used at the "top routing layer" to decide on a per-packet basis whether an outgoing user packet will be routed towards the EPC or will be offloaded non-seamlessly via the WLAN. The ISRPs are configured either statically or dynamically via the ANDSF (Rel-10 enhancement). When steering the packets, the OS needs to use the correct IP address (i.e. CoA versus the Home Address HoA) in the Source Address field of the IP header.

Non-seamless WLAN offload allows for certain IP traffic to leak out of the EPC via the local Care-of Address (CoA-L). It is non-seamless because the leaked traffic is not anchored in the PDN GW.

In the same Rel-10 timeframe 3GPP was developing solutions for Selective IP Traffic Offload (SIPTO). The SIPTO feature allows the network to offload certain traffic (e.g. Internet traffic) either via a femto cell or a macro cell. In the femto cell scenario the candidate traffic can be offloaded on the residential or enterprise IP network, and from there it can be routed onward towards the packets' final destination (e.g. the Internet). As of September 2010, 3GPP has agreed on a solution only for macro-SIPTO. The femto-SIPTO requirement will probably be handled in Rel-11 In either case (femto or macro) the terminal uses the 3GPP cellular access only, which makes any use of the ANDSF framework out of scope.

With SIPTO, the operator can offload selected (typically Internet) traffic by routing it through a PGW that resides close to the RAN. The offload is transparent to the user.

If the UE has an established LIPA connection, performing "femto-SIPTO" equates to routing of Internet-bound traffic via the LIPA connection and as the UE moves out of the femto cell coverage, the Internet-bound traffic can be re-routed via a PDN connection corresponding to a macro cell.

Depicted in FIG. 5 is an example scenario of SIPTO for Internet traffic from a femto cell. In this example the UE has two PDN connections:
One PDN connection via femto cellular access (PDN1) to the Operator's PDN. It is depicted as a grayed tunnel between the UE and the Packet Data Gateway (PGW), a node representing the ingress point to PDN1, which also assigns the IP address used by the UE on this PDN;
Another PDN connection via femto cellular access (PDN2) to the Home or Enterprise IP network. It is also depicted as a grayed tunnel, this time terminated on the Local Gateway (L-GW), a node representing the ingress point to PDN2, which also assigns the IP address used by the UE on the Home or Enterprise IP network.

Similar to the example on non-seamless WLAN offload in FIG. 1, some destinations are reachable only via PDN1 or only via PDN2. For instance, the P-CSCF node (which is the ingress point to the operator's IP multimedia subsystem) is reachable only via PDN1, whereas the Home (or Enterprise) server is reachable only via PDN2. On the other hand, hosts residing in the Internet can be reached via either access.

Performing SIPTO for Internet traffic in this example equates to routing of Internet-bound traffic via PDN2 whenever the UE is in femto cell coverage and has an established PDN2 connection, because the cost of using PDN2 is much lower compared to the cost of using the PDN1.

As the UE moves out of the femto cell coverage, the Internet-bound traffic can be re-routed via PDN1.

A comparison of the use cases described in FIG. 1 and FIG. 5 shows that from an IP routing perspective there are two similar problems to solve. In both situations we are confronted with a multi-homed UE (i.e. UE with multiple IP interfaces) that needs to be assisted in routing of IP packets.

However, there is at least one difference: with the SIPTO/LIPA scenario shown on FIG. 5 the terminal is a single-mode terminal (i.e. it makes use of the 3GPP interface only). Given this, the usage of the ANDSF framework is simply out of scope for this scenario, as ANDSF is used only in conjunction of non-3GPP accesses.

FIG. 6 shows a terminal perspective in a femto-SIPTO context. In this context, steering of IP packets (how to route them for example to HoA1 or HoA2) is not defined by 3GPP. Simultaneous access to LIPA and operator's services requires support for multiple PDN connection. The operating system of the UE needs to cope with multiple IP addresses. Presently ANDSF policies can steer flows toward WLAN, but there are currently no operator policies for routing of IP flows across multiple PDN connections (although it is an old feature in 3GPP systems).

Two other techniques (MAPCON and IFOM) are also available to assist the UE in routing of IP packets based on ANDSF policies, however, neither of them solves the problem of routing across multiple PDN connections.

FIG. 7 represents an overview of an IFOM architecture. IFOM stands for IP Flow Mobility and is specified in TS 23.261. IFOM allows for individual IP flows to be routed over WLAN or over 3GPP access defined for DSMIPv6 only (currently there is no solution with network based mobility). The UE is a dual radio UE; WLAN and 3GPP interface run continuously in parallel. IFOM is also known as "seamless WLAN offload", because flows can be re-routed from one access to another with no service break. From an implementation perspective this is only a DSMIPv6 enhancement. IFOM enables simultaneous multi-access PDN connection to the same APN. So IFOM offers IP flow granularity, but only on a single APN.

FIG. 8 represents an overview of an MAPCON architecture. MAPCON stands for Multi Access PDN CONnectivity. MAPCON allows for entire PDN connections to be routed over WLAN or over 3GPP access. In other words, the granularity of MAPCON is only on a per PDN connection basis, not on a per IP flow basis. MAPCON works with both DSMIPv6 and network based mobility. The UE is a dual radio UE; WLAN and 3GPP interface run continuously in parallel. MAPCON enables simultaneous multiple PDN connectivity to different APNs.

The invention seeks to improve the situation.

SUMMARY OF THE INVENTION

The invention relates in particular to a method for routing an uplink IP packet of a cellular device. The method comprises obtaining, by a routing client of the cellular device, a routing rule from a routing server. The method comprises routing the uplink IP packet, according to the routing rule, through a first PDN connection or through a second PDN connection, both PDN connections being established over the same cellular radio interface of the cellular device. The invention also relates to a cellular device implementing the above method.

To achieve these and other advantages and in accordance with the purpose of the present invention, as embodied and broadly described herein, there is provided a method for A method for routing an uplink IP packet of a cellular device, the method comprising: (a) obtaining, by a routing client of the cellular device, a routing rule from a routing server; and (b) according to the routing rule, routing the uplink IP packet through a first PDN connection or through a second PDN connection, both PDN connections being established over the same cellular radio interface of the cellular device.

Preferably, the routing client may be an ANDSF client and wherein the routing server is an ANDSF server.

Preferably, the first PDN connection may be established with a gateway providing access to a local IP network, and the second PDN connection is established with a mobile operator's packet core network.

Preferably, the routing rule may comprise identification information in the form of an IP 5-tuple allowing the cellular device to identify the candidate traffic class of the uplink IP packet.

Preferably, the routing rule may comprise a list of APNs sorted by priority order, each APN identifying a PDN connection.

Preferably, the step (a) may comprise submitting, by the cellular device, a list of APNs to the routing server, and receiving, from the routing server, a routing rule comprising only a subset of APNs corresponding to the list of APNs submitted.

Furthermore, there is provided a cellular device set to establish two PDN connections over the same cellular radio interface of the cellular device, the cellular device comprising: a routing client set to obtain a routing rule from a routing server, wherein the cellular device is set to route an uplink IP packet through the first or through the second PDN connection depending on the routing rule.

Preferably, the routing client may be an ANDSF client and wherein the routing server is an ANDSF server.

Preferably, the cellular device may be set to establish the two PDN connections through a common femto cell.

Preferably, the cellular device may be set to establish the first PDN connection with a gateway providing access to a local IP network, and to establish the second PDN connection with a mobile operator's packet core network.

Preferably, the routing rule may comprise identification information in the form of an IP 5-tuple allowing the cellular device to identify the candidate traffic class of the uplink IP packet.

Preferably, the routing rule may comprise a list of APNs sorted by priority order, each APN identifying a PDN connection.

Preferably, the cellular device may be set to submit a list of APNs to the routing server, and to receive, from the routing server, a routing rule comprising only a subset of APNs corresponding to the list of APNs submitted.

BRIEF DESCRIPTION OF THE DRAWINGS

Other aspects and advantages of the invention will become apparent from the following detailed description of specific embodiments of the invention, and the accompanying drawings, in which.

DETAILED DESCRIPTION OF THE INVENTION

Figure 1:
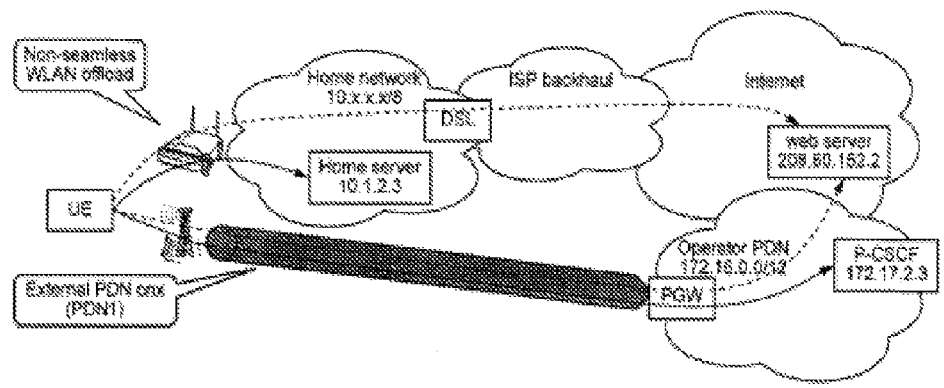
FIG. 1 represents a possible scenario of non-seamless WLAN offload.
Figure 2:
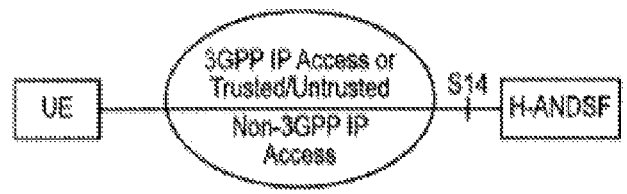
FIG. 2 represents a non-roaming ANDSF architecture.
Figure 3:
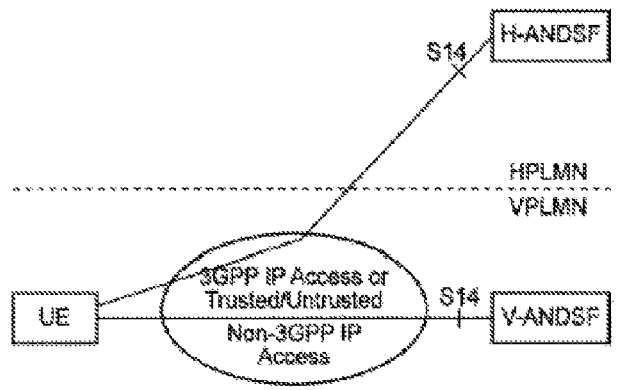
FIG. 3 represents a roaming ANDSF architecture.
Figure 4:
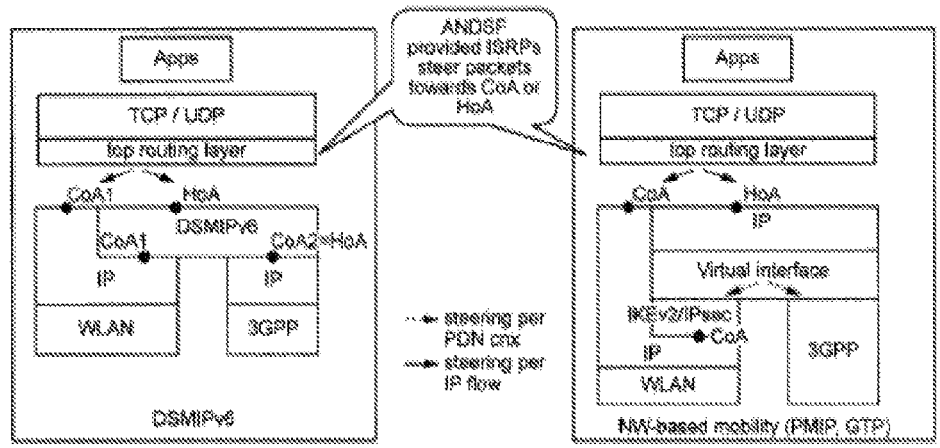
FIG. 4 shows a terminal perspective in the context of a non-seamless WLAN offload.
Figure 5:
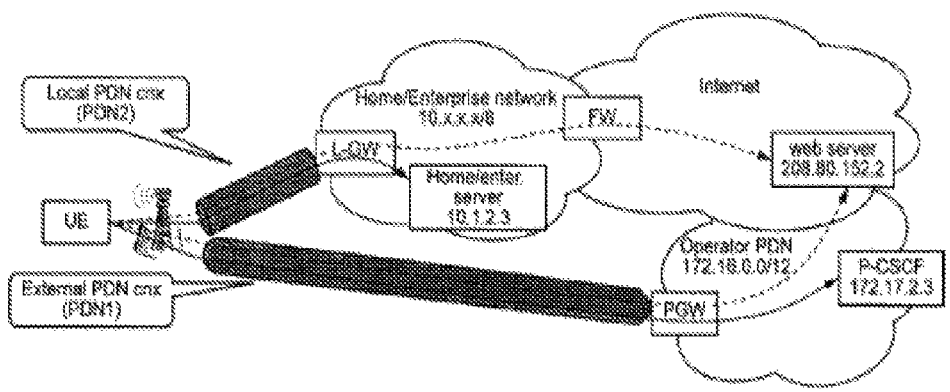
FIG. 5 represent a possible scenario of SIPTO for Internet traffic from a femto cell.
Figure 6:
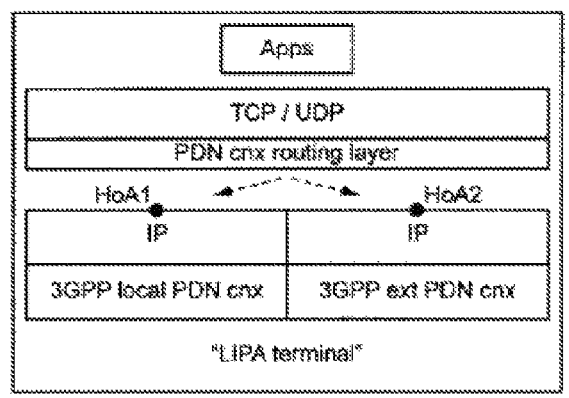
FIG. 6 shows a terminal perspective in a femto-SIPTO context.
Figure 7:
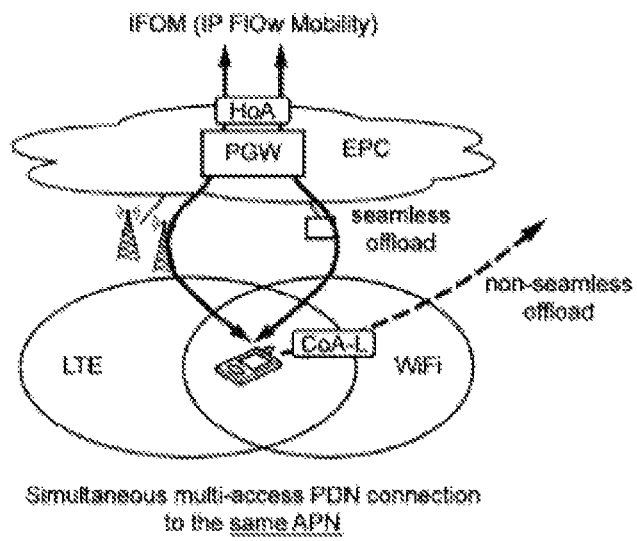
FIG. 7 represents an overview of an IFOM architecture.
Figure 8:
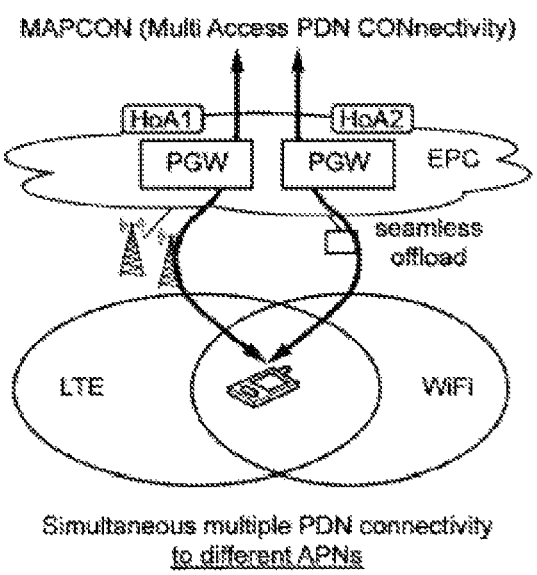
FIG. 8 represents an overview of an MAPCON architecture.

According to a possible embodiment, a method for routing an uplink IP packet of a cellular device comprises obtaining, by a routing client of the cellular device, a routing rule from a routing server. It is possible to obtain a set of routing rules (or policies, both terms being synonymous) from the routing server. Each rule associates a traffic class typically identified via an IP 5-tuple with one or more potential APNs sorted in priority order. The method comprises routing the uplink IP packet, according to the routing rule, through a first PDN connection or through a second PDN connection, both PDN connections being established over the same cellular radio interface of the cellular device. For example routing may be based on identifying to which traffic class the uplink IP packet belongs and selecting the PDN connection corresponding to the highest priority APN in the corresponding routing rule. If the UE has no established PDN connection to the highest priority APN in the corresponding routing rule, it can either select the next priority APN in the sorted APN list (and forward the packet on the PDN connection corresponding to that APN, if available) or it can attempt establishment of a PDN connection to the highest priority APN first. If none of the rules comprises a traffic class to which the particular uplink IP packet to be routed belongs, it is possible to use a default PDN connection. There can be more than two PDN connections at the same time. Accordingly, the method may of course route the uplink IP packet through one out of three or ten or any number of PDN connections (at least two but not necessarily two PDN connections). The method can be implemented in the form of computer software stored in some memory (Flash memory, ROM memory, EEPROM memory, etc.) or other storage medium (hard disk drive, etc.) and to be executed in part by a processor of the cellular device and in part by processors of other relevant entities such as the routing server.

This embodiment is advantageous as it enables the operator to have its say in how the UE should route IP traffic through multiple PDN connections whereas routing was so far carried out according to predefined rules (typically configured by the user). In particular, definition of mobile network operator policies for routing of IP traffic in presence of multiple PDN connections is made possible.

According to a possible embodiment, the routing client is an ANDSF client and the routing server is an ANDSF server. The ANDSF server may be a standard ANDSF server storing new types of routing rules according to the invention. The ANDSF client may be a standard ANDSF client. Using ANDSF is advantageous as it is an already standardized technology. It is therefore possible to use ANDSF to provide steering policies (in the form of routing rules) in presence of multiple 3GPP interfaces.

According to a possible embodiment, both PDN connections are established through a common femto cell. In particular, the first PDN connection may be established with a gateway providing access to a local IP network (a LIPA access), and the second PDN connection may be established with a mobile operator's packet core network.

According to a possible embodiment, the routing rule comprises identification information in the form of an IP 5-tuple allowing the cellular device to identify the candidate traffic class of the uplink IP packet. This makes it possible to discriminate, for example, between Internet access (based on public IP addresses), and a mobile operator's internal service using specific IP address classes/ranges such as 10.x.x.x (in IPv4). The invention is not limited to IPv4 and works with IPv6 as well.

According to a possible embodiment, the routing rule comprises a list of APNs sorted by priority order, each APN identifying a PDN connection. Accordingly, the rules can map various traffic classes with corresponding sorted lists of APNs. The cellular device can then, when requested to route a given uplink IP packet, check to which traffic class (if any) it belongs, and pick the highest priority APN for which there is currently an open (active) PDN connection. The uplink IP packet can then be routed towards such PDN connection. It is possible to incorporate, inside the list of APNs, non PDN related choices, for example in order to enable non-seamless WLAN offload when this makes sense. For example, the first choice could be a first PDN connection, the second choice could be a WLAN through non seamless offload, and the third one could be yet another PDN connection (which may end up being the one selected if the two previous ones are inactive).

According to a possible embodiment, step /a/ comprises submitting, by the cellular device, a list of APNs to the routing server, and receiving, from the routing server, a routing rule comprising only a subset of APNs corresponding to the list of APNs submitted. For example, instead of sending from the routing server to the cellular device a rule associating, for a given traffic class, all possible APNs (sorted), it is possible to send a rule, associating for a given traffic class, only APNs taken from the submitted list of APNs. This is advantageous, because the routing server does not necessarily know all APNs to which the user of the cellular device is subscribed. For example, ANDSF servers are distinct from HSS servers which normally store such lists of APNs on a per subscriber (i.e. cellular device user) basis, and there is no standard protocol available to establish a communication between the ANDSF server and the HSS server for such exchange of APN information. The ANDSF server (or any routing server according to the invention) could be configured to replicate the APN information (for example with a dedicated protocol). However this embodiment offers a simple alternative. The list of APNs submitted by the cellular device to the routing server can be a list of all APNs for which the cellular device user has a subscription. It is also possible to optimize this list dynamically, by sending, among the APNs for which there is a subscription, only the APNs for which there is a currently active PDN connection (and therefore available for routing the uplink IP packet).

The invention also relates to a cellular device set to establish two PDN connections over the same cellular radio interface of the cellular device. The cellular device comprises a routing client set to obtain a routing rule from a routing server. The cellular device is set to route an uplink IP packet through the first or through the second PDN connection depending on the routing rule.

According to a possible embodiment, the routing client is an ANDSF client and the routing server is an ANDSF server. Accordingly it is proposed to use the ANDSF framework to provide policies to a multi-homed cellular terminal that will assist it in routing of IP packets.

According to a possible embodiment, the cellular device is set to establish the two PDN connections through a common femto cell.

According to a possible embodiment, the cellular device is set to establish the first PDN connection with a gateway providing access to a local IP network, and to establish the second PDN connection with a mobile operator's packet core network.

According to a possible embodiment, the routing rule comprises identification information in the form of an IP 5-tuple allowing the cellular device to identify the candidate traffic class of the uplink IP packet.

According to a possible embodiment, the routing rule comprises a list of APNs sorted by priority order, each APN identifying a PDN connection.

According to a possible embodiment, the cellular device is set to submit a list of APNs to the routing server, and to receive, from the routing server, a routing rule comprising only a subset of APNs corresponding to the list of APNs submitted.

According to a possible embodiment, it is proposed to extend the application scope of the ANDSF architecture to UEs making use of their cellular interface only. At any time a UE according to a possible embodiment can connect to the ANDSF function (either in the Home or in the Visited network or both) via cellular access and request operator's policies for routing of IP traffic in presence of multiple PDN connections. The PDN connections are identified via their associated Access Point Name (APN). The APNs submitted in the UE's request may or may not correspond to the APNs of actually established PDN connections (for instance, the UE may submit a general request for all APNs to which it is subscribed in advance, regardless of whether there are any established PDN connections).

The ANDSF can then respond to the request of the UE by providing the operator's policies for routing of IP traffic in presence of multiple PDN connections, which may consist of the following:

Information allowing the UE to identify the candidate traffic class, typically in the form of an IP 5-tuple;

A subset of all APNs (among the list of APNs submitted by the UE) that can be used for routing of this specific candidate traffic class, sorted in priority order.

Based on this information, in presence of multiple established PDN connections the UE may build a routing table and route IP packets accordingly.

As PDN connections are established or released, the routing table in the UE can be adjusted by always choosing the PDN whose APN was ranked with highest priority for a specific candidate traffic class.

The above embodiments are applicable to any scenario with cellular-only terminal that may be engaged in multiple PDN connections in parallel, such as SIPTO scenarios (as under study in 3GPP Release-10).

According to possible embodiments, 3GPP TS 23.402 can be modified as follows.

In the current version of 3GPP TS 23.402, Inter-System Routing Policies (ISRPs) can be in general seen in the form of an association of Candidate Traffic with a Routing Destination.

In Rel-10, Candidate Traffic can be identified as:
Specific IP flow on a specific APN or any APN;
All IP flows on a PDN connection to a specific APN (this is mainly for MAPCON).
Also in Rel-10, Routing Destination can be in the form of:
3GPP accesses;
WLAN access with specific/any SSID for seamless offload;
WLAN access with specific/any SSID for non-seamless offload.

As seen from the above description, the APN is present only in the Candidate Traffic detection, but not in the Routing Destination. This means that in presence of multiple PDN connections to different APNs, the operator will still not be able to assist the UE on where to route the IP traffic flows. In Rel-11, SIPTO offload via the local PDN connection (a Rel-11 requirement) is an example use case where this kind of assistance may be beneficial.

According to a possible embodiment of the invention, APN information is added in the Routing Destination so that the UE can be instructed about which IP flow should go in which APN.

More specifically, according to a first variant, the general principles of Network Discovery and Selection (as specified in clause 4.8.0 of 3GPP TS 23.402) are modified so that the following principle applies when the UE is registered in the Home PLMN or in a PLMN which is equivalent to the home PLMN and when UE is capable of establishing multiple PDN connections to different APNs over 3GPP access, over non-3GPP access or both: if the UE is capable of routing different IP flows across multiple APNs, the EPS network shall allow the operator to influence the APN to which a specific IP flow shall be routed. In the first variant, the following principles apply when the UE is registered in a Visited PLMN (VPLMN) and when UE is capable of establishing multiple PDN connections to different APNs over 3GPP access, over non-3GPP access or both:

The VPLMN shall be able to provide to a roaming UE Inter-System Routing Policies for routing of IP flows across multiple APNs. Such policies shall be valid only in the VLPMN or in a PLMN equivalent to the VPLMN, as per roaming agreements;
The HPLMN shall be able to provide to a roaming UE Inter System Routing Policies for routing of IP flows across multiple APNs.

Optionally, in the first variant, the Inter-System Routing Policies for routing of IP flows across multiple APNs over the same radio access can be used together with inter-system mobility policies.

In the first variant, the Inter-System Routing Policy according to clause 4.8.2.1 3) can be modified as follows.

The ANDSF may provide a list of Inter-System Routing Policies to UEs that are capable of routing IP traffic simultaneously over multiple radio access interfaces and/or over multiple APNs. The UE may use the inter-system routing policies when it can route IP traffic simultaneously over multiple radio access interfaces (e.g. it is an IFOM capable UE with the IFOM capability enabled) and/or over multiple APNs in order to meet the operator routing/offload preferences by:
deciding when an access technology type/access network and/or APN is restricted for a specific IP traffic flow;
deciding when an access technology type/access network is restricted for a specific APN;
selecting the most preferable access technologies/access networks and/or APNs which shall be used by the UE when available to route IP traffic that matches specific criteria (e.g. all traffic to a specific APN, or all traffic belonging to a specific IP flow, or all traffic of a specific application, etc).

The inter-system routing policy may be provisioned in the UE and may be updated by the ANDSF based on network triggers or after receiving a UE request for network discovery and selection information.

Each inter-system routing policy may include the following information:
Validity conditions, i.e. conditions indicating when the provided policy is valid.
One or more Filter Rules, each one identifying a prioritized list of APNs which shall be used by the UE when PDN connections to these APNs are available to route traffic that matches specific IP filters. This Filter Rule may also identify which traffic shall or shall not be non-seamlessly offloaded to a WLAN when available, if the UE supports the non-seamless WLAN offload capability specified in clause 4.1.5;
One or more Filter Rules, each one identifying a prioritized list of access technologies/access networks which shall be used by the UE when available to route traffic that matches specific IP filters on a specific APN or on any APN. A filter rule also identifies which radio accesses are restricted for traffic that matches specific IP filters on a specific APN or on any APN (e.g. WLAN is not allowed for RTP/RTCP traffic flows on APN-x);
One or more Filter Rules, each one identifying a prioritized list of access technologies/access networks which shall be used by the UE when available to route PDN connections to specific APNs. A filter rule also identifies which radio accesses are restricted for PDN connections to specific APNs (e.g. WLAN is not allowed for PDN connection to APN-x).

According to a second variant, it is proposed to complement Network Discovery and Selection (as specified in clause 4.8) by adding Inter-APN Routing Policies defined as follows.

The ANDSF may be used for provision of Inter-APN Routing Policies (IARPs) to UEs that are capable of routing IP flows across multiple PDN connections, regardless of whether the UE supports non-3GPP access or not.

The UE may use the IARPs when it can route IP flows over multiple PDN connections in order to meet the operator routing/offload preferences by:
deciding when an APN is restricted for a specific IP flow; and
selecting the most preferable APN which shall be used by the UE, when a PDN connection to that APN is available, to route IP flows that match specific IP filters.

The IARPs may be provisioned in the UE and may be updated by the ANDSF based on network triggers or after receiving a UE request.

Each IARP may include the following information:
Validity conditions, i.e. conditions indicating when the provided policy is valid.
One or more Filter Rules, each one identifying a prioritized list of APNs which shall be used by the UE when PDN connections to these APNs are available to route traffic that matches specific IP filters. This Filter Rule may also identify which traffic shall or shall not be non-seamlessly offloaded to a WLAN when available, if the UE supports the non-seamless WLAN offload capability specified in clause 4.1.5;
IARPs are carried out in OMA DM management object(s).

All embodiments described in relation to the method according to the invention can be transposed to the cellular device embodiment, and vice versa.

The invention is not limited to the above described exemplary embodiments, and also encompasses many different variants. In particular, most embodiments have been described in the context of 3GPP, but can be adapted to a different context. More generally, the invention is applicable to other wireless technologies such as WCDMA, GSM, CDMA2000, TD-SCDMA, or WiMAX. The vocabulary used in the described embodiment is the conventional vocabulary in the context of LTE, however other standards use a different terminology. The invention is not limited to LTE by the use of LTE vocabulary. For example the GSM standard refers to "mobile stations" comprising a "mobile equipment" (typically a cell phone) equipped with a SIM card. Despite the fact that the described embodiments commonly refer to a "user equipment", any communication device compliant with the requirement laid out in relation with said embodiments is appropriate, even a GSM compliant communication device.

What is claimed is:

1. A method for routing a data packet of a user equipment (UE) in a wireless communication network, the method comprising:
    establishing, by the UE, a packet data network (PDN) connection via a 3rd Generation Partnership Project (3GPP) cellular network;
    obtaining, by the UE from an Access Network Discovery and Selection Function (ANDSF) server, a routing rule including information on an access point name (APN) and a priority of the APN, the APN identifying a packet data network (PDN) connection; and
    performing, by the UE, an offload function by selecting a gateway via the 3GPP cellar network based on the priority of the APN,
    wherein the routing rule comprises identification information in the form of an IP 5-tuple allowing the UE to route the data packet, and
    wherein the form of an IP 5-tuple includes a source IP address, a source port number, a destination IP address, a destination port number and a protocol in use.

2. The method of claim 1, wherein the UE is an ANDSE client.

3. A user equipment (UE) routing a data packet in a wireless communication network, the UE comprising:
    a transceiver configured to communicate with an Access Network Discovery and Selection Function (ANDSF) server;
    a processor coupled to the transceiver and configured to:
        control the transceiver to establish a packet data network (PDN) connection via a 3rd Generation Partnership Project (3GPP) cellular network,
        obtain, from the ANDSF server, a routing rule including information on an access point name (APN) and a priority of the APN, the APN identifying a packet data network (PDN) connection, and
        perform an offload function by selecting a gateway via the 3GPP cellular access network based on the priority of the APN,
    wherein the routing rule comprises identification information in the form of an IP 5-tuple allowing the UE to route the data packet, and
    wherein the form of an IP 5-tuple includes a source IP address, a source port number, a destination IP address, a destination port number and a protocol in use.

4. The UE of claim 3, wherein the UE is an ANDSF client.

* * * * *